United States Patent
Degner et al.

(10) Patent No.: US 10,566,888 B2
(45) Date of Patent: Feb. 18, 2020

(54) LINEAR ACTUATORS FOR USE IN ELECTRONIC DEVICES

(71) Applicant: Apple Inc., Cupertino, CA (US)

(72) Inventors: Brett W. Degner, Cupertino, CA (US); David H. Narajowski, Cupertino, CA (US); Jonah A. Harley, Los Gatos, CA (US); Alyssa J. Garver, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 15/260,047

(22) Filed: Sep. 8, 2016

(65) Prior Publication Data

US 2017/0070131 A1 Mar. 9, 2017

Related U.S. Application Data

(60) Provisional application No. 62/215,686, filed on Sep. 8, 2015.

(51) Int. Cl.
*H02K 33/00* (2006.01)
*H02K 33/18* (2006.01)
(Continued)

(52) U.S. Cl.
CPC ............... *H02K 33/00* (2013.01); *H02K 1/34* (2013.01); *H02K 33/16* (2013.01); *H02K 33/18* (2013.01);
(Continued)

(58) Field of Classification Search
CPC .......... H02K 5/00; H02K 1/34; H02K 7/1869; H02K 7/1876; H02K 7/1892; H02K 33/00;
(Continued)

(56) References Cited

U.S. PATENT DOCUMENTS

| | | |
|---|---|---|
| 3,001,049 A | 9/1961 | Didier |
| 3,390,287 A | 6/1968 | Sonderegger |

(Continued)

FOREIGN PATENT DOCUMENTS

| | | |
|---|---|---|
| AU | 2015100710 | 7/2015 |
| AU | 2016100399 | 5/2016 |

(Continued)

OTHER PUBLICATIONS

Takaishi Yosuke, Hasegawa Haruyuki, Katae Toru, Cylindrical Linear Motor, Mitsubishi Electric, WO 2013069148 (English Machine Translation) (Year: 2013).*

(Continued)

*Primary Examiner* — Jermele M Hollington
*Assistant Examiner* — Alexander A Singh
(74) *Attorney, Agent, or Firm* — Brownstein Hyatt Farber Schreck, LLP

(57) ABSTRACT

Embodiments described herein may take the form of an electromagnetic actuator that produces a haptic output during operation. Generally, an electromagnetic coil is wrapped around a central magnet array. A shaft passes through the central magnet array, such that the central array may move along the shaft when the proper force is applied. When a current passes through the electromagnetic coil, the coil generates a magnetic field. The coil is stationary with respect to a housing of the actuator, while the central magnet array may move along the shaft within the housing. Thus, excitation of the coil exerts a force on the central magnet array, which moves in response to that force. The direction of the current through the coil determines the direction of the magnetic field and thus the motion of the central magnet array.

20 Claims, 10 Drawing Sheets

(51) Int. Cl.
*H02K 1/34* (2006.01)
*H02K 33/16* (2006.01)
*H02K 35/02* (2006.01)
*H02K 35/00* (2006.01)
*H02K 7/08* (2006.01)

(52) U.S. Cl.
CPC .............. *H02K 35/00* (2013.01); *H02K 35/02* (2013.01); *H02K 7/08* (2013.01)

(58) Field of Classification Search
CPC ........ H02K 33/02; H02K 33/04; H02K 33/06; H02K 33/08; H02K 33/10; H02K 33/12; H02K 33/14; H02K 33/16; H02K 33/18; H02K 35/00; H02K 35/02; H02K 35/04; H02K 35/06; H02K 3/28; H02K 7/003; H02K 7/08
USPC .. 310/89, 12.01, 12.02, 12.03, 12.04, 12.05, 310/12.06, 12.07, 12.08, 12.09, 12.11, 310/12.12, 12.13, 12.14, 12.15, 12.21
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,490,815 A | 12/1984 | Umehara et al. |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,198,206 B1 | 3/2001 | Saarmaa |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,437,485 B1 | 8/2002 | Johansson |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |

(56) References Cited

U.S. PATENT DOCUMENTS

| | | |
|---|---|---|
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,593,409 B1 | 11/2013 | Heubel |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,717,309 B2 | 5/2014 | Almalki |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,984 B2 | 8/2015 | Heubel et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |

(56) References Cited

U.S. PATENT DOCUMENTS

| | | |
|---|---|---|
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,430,042 B2 | 8/2016 | Levin |
| 9,448,628 B2 | 9/2016 | Tan et al. |
| 9,449,476 B2 | 9/2016 | Lynn |
| 9,452,268 B2 | 9/2016 | Badaye et al. |
| 9,477,342 B2 | 10/2016 | Daverman et al. |
| 9,501,912 B1 | 11/2016 | Hayskjold et al. |
| 9,542,028 B2 | 1/2017 | Filiz et al. |
| 9,544,694 B2 | 1/2017 | Abe et al. |
| 9,576,445 B2 | 2/2017 | Cruz-Hernandez |
| 9,595,659 B2 | 3/2017 | Kim |
| 9,600,070 B2 | 3/2017 | Chatterjee et al. |
| 9,622,214 B2 | 4/2017 | Ryu |
| 9,659,482 B2 | 5/2017 | Yang et al. |
| 9,594,450 B2 | 7/2017 | Lynn et al. |
| 9,727,157 B2 | 8/2017 | Ham et al. |
| 9,778,743 B2 | 10/2017 | Grant et al. |
| 9,779,592 B1 | 10/2017 | Hoen |
| 9,823,833 B2 | 11/2017 | Grant et al. |
| 9,904,393 B2 | 2/2018 | Frey et al. |
| 9,934,661 B2 | 4/2018 | Hill |
| 9,990,099 B2 | 6/2018 | Ham et al. |
| 10,061,386 B2 | 8/2018 | Frescas et al. |
| 10,062,832 B2 | 8/2018 | Caraveo et al. |
| 10,067,585 B2 | 9/2018 | Kim |
| 10,139,907 B2 | 11/2018 | Billington |
| 10,139,959 B2 | 11/2018 | Butler et al. |
| 10,204,494 B2 | 2/2019 | Do et al. |
| 10,338,682 B2 | 7/2019 | Heubel et al. |
| 10,345,905 B2 | 7/2019 | McClure et al. |
| 10,367,950 B2 | 7/2019 | Davis et al. |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0291670 A1 | 11/2009 | Sennett et al. |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0110018 A1 | 5/2010 | Faubert et al. |
| 2010/0134225 A1* | 6/2010 | Yajima ............... H02K 41/0356 335/229 |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0157052 A1 | 6/2011 | Lee et al. |
| 2011/0163985 A1 | 7/2011 | Bae et al. |
| 2011/0193824 A1 | 8/2011 | Modarres et al. |
| 2011/0216013 A1 | 9/2011 | Siotis |
| 2011/0239383 A1* | 10/2011 | Nishiura ............ A61C 17/3445 15/22.1 |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0206248 A1 | 8/2012 | Biggs |
| 2012/0256848 A1 | 10/2012 | Madabusi |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0043987 A1 | 2/2013 | Kasama et al. |
| 2013/0058816 A1* | 3/2013 | Kim ..................... F04B 35/045 417/437 |

(56) References Cited

U.S. PATENT DOCUMENTS

| | | |
|---|---|---|
| 2013/0063285 A1 | 3/2013 | Elias |
| 2013/0063356 A1 | 3/2013 | Martisauskas |
| 2013/0106699 A1 | 5/2013 | Babatunde |
| 2013/0141365 A1 | 6/2013 | Lynn et al. |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0085065 A1 | 3/2014 | Biggs et al. |
| 2014/0143785 A1 | 5/2014 | Mistry et al. |
| 2014/0168153 A1 | 6/2014 | Deichmann et al. |
| 2014/0183980 A1* | 7/2014 | Maeda .................. H02K 5/128 310/12.11 |
| 2014/0197936 A1 | 7/2014 | Biggs et al. |
| 2014/0232534 A1 | 8/2014 | Birnbaum et al. |
| 2014/0247227 A1 | 9/2014 | Jiang et al. |
| 2014/0265651 A1* | 9/2014 | Kim ....................... H02K 33/16 310/25 |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0040005 A1 | 2/2015 | Faaborg |
| 2015/0090572 A1 | 4/2015 | Lee et al. |
| 2015/0098309 A1 | 4/2015 | Adams et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0205355 A1 | 7/2015 | Yairi |
| 2015/0205417 A1 | 7/2015 | Yairi et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0103544 A1 | 4/2016 | Filiz et al. |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0084138 A1 | 3/2017 | Hajati et al. |
| 2017/0085163 A1 | 3/2017 | Hajati et al. |
| 2017/0090667 A1 | 3/2017 | Abdollahian et al. |
| 2017/0153703 A1 | 6/2017 | Yun et al. |
| 2017/0192507 A1 | 7/2017 | Lee et al. |
| 2017/0192508 A1 | 7/2017 | Lim et al. |
| 2017/0242541 A1 | 8/2017 | Iuchi et al. |
| 2017/0255295 A1 | 9/2017 | Tanemura et al. |
| 2017/0257844 A1 | 9/2017 | Miller et al. |
| 2017/0285747 A1 | 10/2017 | Chen |
| 2017/0311282 A1 | 10/2017 | Miller et al. |
| 2017/0315618 A1 | 11/2017 | Ullrich et al. |
| 2017/0345992 A1 | 11/2017 | Noguchi |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0060941 A1 | 3/2018 | Yang et al. |
| 2018/0075715 A1 | 3/2018 | Morrell et al. |
| 2018/0081441 A1 | 3/2018 | Pedder et al. |
| 2018/0174409 A1 | 6/2018 | Hill |
| 2018/0203513 A1 | 7/2018 | Rihn |
| 2018/0302881 A1 | 10/2018 | Miller et al. |
| 2019/0027674 A1 | 1/2019 | Zhang et al. |
| 2019/0159170 A1 | 5/2019 | Miller et al. |
| 2019/0214895 A1 | 7/2019 | Moussette et al. |
| 2019/0250713 A1 | 8/2019 | Chen |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104220963 | 12/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2207080 | 7/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |

(56) References Cited

FOREIGN PATENT DOCUMENTS

| | | |
|---|---|---|
| JP | 2013149124 | 8/2013 |
| JP | 2014002729 | 1/2014 |
| JP | 2014509028 | 4/2014 |
| JP | 2014235133 | 12/2014 |
| JP | 2014239323 | 12/2014 |
| JP | 2015153406 | 8/2015 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 00/051190 | 8/2000 |
| WO | WO 01/059588 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO-2013069148 A1 * 5/2013 ........... H02K 41/031 |
| WO | WO 13/150667 | 10/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 13/169299 | 11/2014 |
| WO | WO 15/023670 | 2/2015 |
| WO | WO 16/141482 | 9/2016 |

OTHER PUBLICATIONS

U.S. Appl. No. 15/800,630, filed Nov. 1, 2017, Morrell et al.
U.S. Appl. No. 15/881,476, filed Jan. 26, 2018, Moussette et al.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
Nakamura, "A Torso Haptic Display Based on Shape Memory Alloy Actuators," Massachusetts Institute of Technology, 2003, pp. 1-123.
Actuator definition downloaded from http://www.thefreedictionary.com/actuator on May 3, 2018, 2 pages.
International Search Report and Written Opinion dated Nov. 17, 2016, PCT/US2016/050770, 28 pages.
U.S. Appl. No. 15/897,968, filed Feb. 15, 2018, Hill.
U.S. Appl. No. 14/165,475, filed Jan. 27, 2014, Hayskjold et al.
U.S. Appl. No. 15/047,447, filed Feb. 18, 2016, Augenbergs et al.
U.S. Appl. No. 15/098,669, filed Apr. 14, 2016, Uttermann et al.
U.S. Appl. No. 15/102,826, filed Jun. 8, 2016, Smith et al.
U.S. Appl. No. 16/259,645, filed Jan. 28, 2019, Miller et al.
U.S. Appl. No. 16/352,784, filed Mar. 13, 2019, Moussette et al.
PuntoCellulare, "LG-GD910 3G Watch Phone," YouTube (http://www.youtube.com/watch?v+HcCI87KIELM), Jan. 8, 2009, 9 pages.
Sullivan, Mark, "This Android Wear Update Turns Your Device into The Dick Tracy Watch," Fast Company (https://www.fastcompany.com/3056319/this-android-wear-update-turns-your-device-into-the-dick-tracy-watch), Feb. 4, 2016, 9 pages.

* cited by examiner

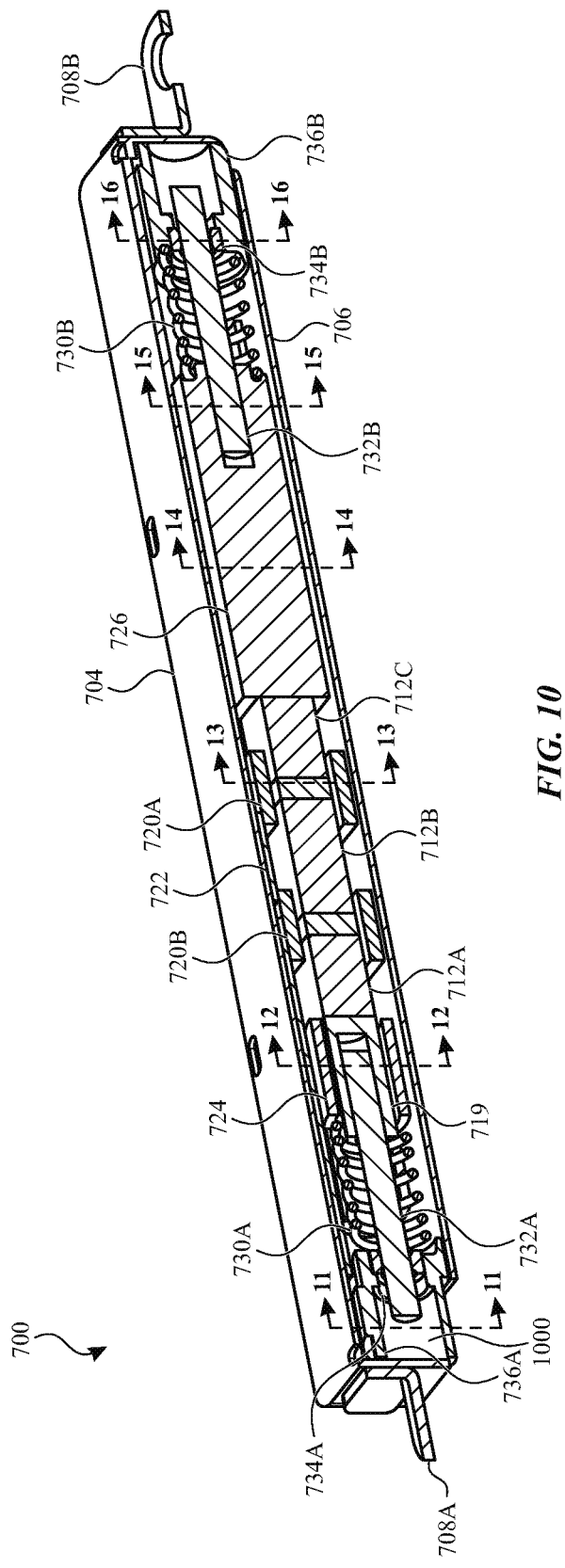
*FIG. 10*
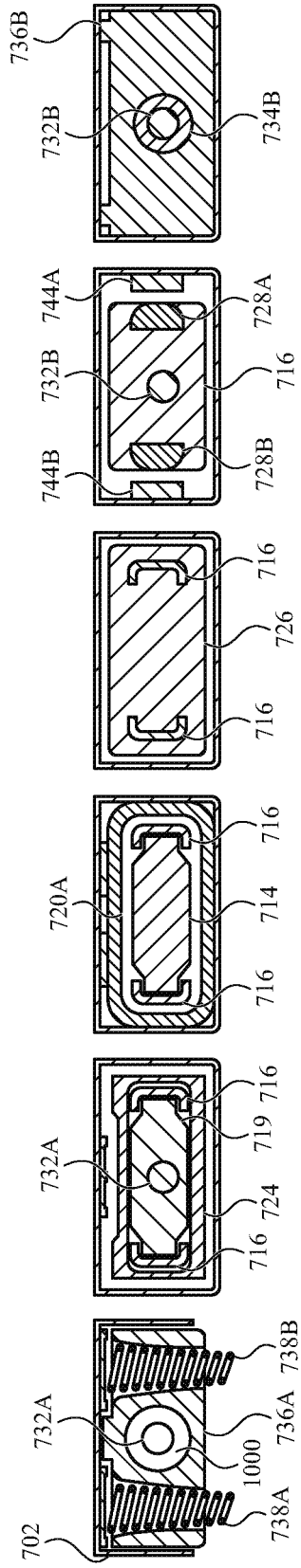

LINEAR ACTUATORS FOR USE IN ELECTRONIC DEVICES

CROSS-REFERENCE TO RELATED APPLICATION

This application claims the benefit under 35 U.S.C. § 119(e) of U.S. Provisional Patent Application No. 62/215,686, filed on Sep. 8, 2015, and entitled "Linear Actuators for Use in Electronic Devices," the contents of which are incorporated by reference as if fully disclosed herein.

FIELD

Embodiments described herein generally relate to actuators for producing a haptic force, and more particularly to a resonant linear actuator that moves bidirectionally in response to electromagnetic motive forces.

BACKGROUND

Many modern portable electronic devices include actuators to provide alerts and notifications. As one common example, many mobile phones include a rotary vibration motor with an eccentric weight that spins rapidly in order to produce a vibration. This vibration may alert a user to an incoming telephone call when the phone is muted, for example. The vibration takes the place of the standard audio alert and may be felt by the user if he or she is touching the phone. However, the vibration may still be noisy in certain environments and this may be undesirable.

Further, many rotary mass actuators not only create an audible buzz, but also an undesirable feel. Because rotary mass actuators spin up to an operating state and then wind down to a rest state, they constantly shake the enclosure of the electronic device. This feels "buzzy" to a user and there is little, if any, control over the haptic output of such a device other than to control the amplitude of the output or to provide discrete outputs with an unacceptably long time between the outputs.

Certain linear actuators are used instead of rotary mass actuators in some electronic devices. Linear actuators may deliver a more crisp haptic output and are quieter in certain cases. However, many such linear actuators are relatively large and some may move a mass only in a single direction.

Accordingly, an improved linear actuator may be useful.

SUMMARY

Embodiments described herein may take the form of a linear actuator capable of moving bidirectionally. Embodiments may provide a substantial haptic output resulting from relatively small motion of a mass within the actuator.

One embodiment may take the form of a haptic feedback system for an electronic device, comprising: a magnet assembly; a first shaft operably connected to the magnet assembly; a second shaft operably connected to the magnet assembly; a first spring surrounding the first shaft; a second spring surrounding the second shaft; and an electromagnetic structure operative to exert a motive force on the magnet assembly, whereby the magnet assembly, first shaft, and second shaft may translate in response to the motive force; wherein the electromagnetic structure encircles at least a portion of the magnet assembly when the magnet assembly is in a rest state.

Another embodiment may take the form of a method for providing haptic feedback, comprising: energizing multiple coils surrounding a set of magnets; moving the set of magnets in a first direction in response to energizing the multiple coils, thereby compressing a first spring; moving a first shaft in the first direction; de-energizing multiple coils; expanding the spring, thereby returning the set of magnets to an initial magnet position and the first shaft to an initial shaft position; moving the set of magnets in a second direction, thereby compressing a second spring; moving a second shaft in the second direction; and expanding the spring, thereby returning the set of magnets to the initial magnet position and the second shaft to a second initial shaft position.

Still another embodiment may take the form of an actuator for an electronic device, comprising: a housing; multiple magnets; a set of spacers, each of the spacers in the set separating two magnets of the multiple magnets; a group of coils surrounding a portion of the multiple magnets; a main mass affixed to a first magnet of the multiple magnets; an end mass affixed to a second magnet of the multiple magnets; a first shaft received within, and extending from, the main mass; a second shaft received within, and extending from, the end mass; a first bearing encircling the first shaft; a second bearing encircling the second shaft; a first end cap affixed to the housing and defining a first aperture; a second end cap affixed to the housing and defining a second aperture; a first spring around the first shaft and constrained by the first end cap and the main mass; a second spring around the second shaft and constrained by the second end cap and the second mass; and guide rails configured to constrain a motion of the multiple magnets, main mass, and end mass; wherein the multiple magnets, main mass, and end mass are configured to move along the guide rails.

These and other embodiments, as well as the operations and uses thereof, will be apparent upon reading the specification in its entirety.

BRIEF DESCRIPTION OF THE FIGURES

FIG. 10 shows a second cross-section of the linear actuator of FIGS. 7 and 8.

FIG. 11 shows a third cross-section of the linear actuator of FIGS. 7 and 8, taken along line 11-11 of FIG. 10.

FIG. 12 shows a fourth cross-section of the linear actuator of FIGS. 7 and 8, taken along line 12-12 of FIG. 10.

FIG. 13 shows a fifth cross-section of the linear actuator of FIGS. 7 and 8, taken along line 13-13 of FIG. 10.

FIG. 14 shows a sixth cross-section of the linear actuator of FIGS. 7 and 8, taken along line 14-14 of FIG. 10.

FIG. 15 shows a seventh cross-section of the linear actuator of FIGS. 7 and 8, taken along line 15-15 of FIG. 10.

FIG. 16 shows an eighth cross-section of the linear actuator of FIGS. 7 and 8, taken along line 16-16 of FIG. 10.

The use of the same or similar reference numerals in different figures indicates similar, related, or identical items.

Figure 1:
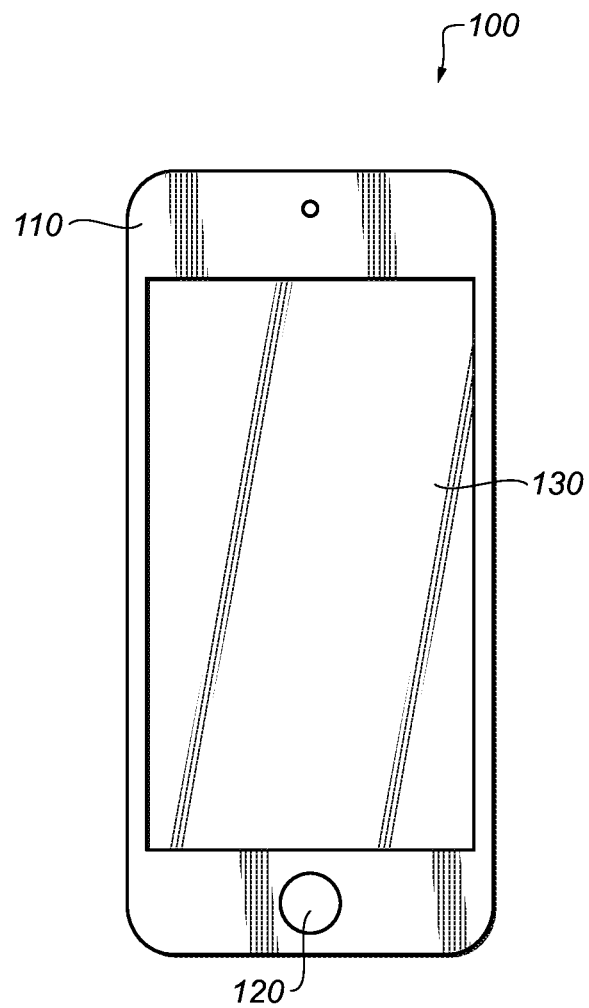
FIG. 1 depicts a sample electronic device that may incorporate a linear actuator, as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figure.

DETAILED DESCRIPTION

Embodiments described herein may take the form of an electromagnetic actuator that produces a haptic output during operation. Generally, an electromagnetic coil is wrapped around a central magnet array. A shaft passes through the central magnet array, such that the central array may move along the shaft when the proper force is applied.

When a current passes through the electromagnetic coil, the coil generates a magnetic field. The coil is stationary with respect to a housing of the actuator, while the central magnet array and an associated frame may move along the shaft within the housing. (The frame and array together form a mass assembly.) Thus, excitation of the coil exerts a force on the central magnet array, which moves in response to that force. The direction of the current through the coil determines the direction of the magnetic field and thus the motion of the central magnet array. It should be appreciated, however, that alternative embodiments may generate a motive force through other means, such as purely through the injection of flux into the coil by operation of injector magnets as described elsewhere herein.

Generally, the central magnet array may slide along the shaft in response to the magnetic field generated by the coil. The central magnet array may be placed within, coupled to, or otherwise associated with a weight, such as a frame, that also moves with the array. The frame adds mass to the central magnet array and so may provide a greater haptic output in response to motion than would the array alone.

One or more bearings, such as jewel bearings, may form the interface between the central magnet array and the shaft. The bearings may be shaped to reduce contact between the bearing interiors and the shaft, thereby reducing friction and permitting greater, and/or higher velocity, motion along the shaft by the central magnet array. Further, the shape of the bore through the bearings reduces the likelihood that the bearings and/or shaft are constrained, thereby avoiding binding and/or friction due to misalignment of portions of the actuator.

The shaft may be affixed to the housing of the actuator at both ends. A separate spring, such as a beehive (or double beehive) spring, may encircle each end of the shaft and abut both the interior of the housing and the frame. The springs may allow the coil and array (e.g., the mass assembly) to increase an amplitude of the array's motion with each excursion from a rest state and, also may prevent the frame from hitting or crashing into the housing. Further, the springs may return the mass assembly to its rest position at or near the center of the housing. In some embodiments, the springs may cooperate with the coil's magnetic field to return the central magnet array/mass assembly to its rest position.

In another embodiment, a first shaft extends into a magnet assembly on a first side while a second shaft extends into the magnet array from a second side. The shafts may be coupled to the magnet assembly on one end while their opposing ends are free. The magnet assembly may incorporate a first mass on one side and be coupled to a second mass on another side. That is, this second embodiment of a linear actuator may employ a split mass to provide haptic output.

A coil spring (as opposed to the aforementioned beehive spring) may encircle each shaft. One coil spring may abut a first end cap and the magnet assembly, and in particular the first mass. The second coil spring may abut a second end cap and the second mass. Both shafts may pass through bearings; one bearing may be positioned in each end cap.

Multiple coils may be wrapped around the magnet assembly. When the coils are energized, the magnet assembly, shafts, and mass(es) (collectively, "moving portion") may translate within a housing of the actuator. Such translation may compress the spring on the side of the actuator toward which the moving portion moves. The shafts may slide within their respective bearings to permit such translation. This motion may in turn be conveyed to the housing or frame of the actuator.

In the various embodiments described herein, the frame's motion, and changes in direction of motion, is transmitted to the housing of the actuator as a force. Accordingly, as the frame moves and/or changes direction, the housing experiences forces that cause it to move. This motion may be felt or otherwise sensed by a person holding or otherwise in contact with the actuator; the motion may thus provide a haptic output sensed by the user/wearer. Typically, the greater the momentum of the central magnet array and frame, the greater the force exerted on the housing in a short period of time and the greater the magnitude of the haptic output.

Certain embodiments may employ a set of injector magnets positioned on opposing sides or faces of the frame. The injector magnets may be adjacent or otherwise near stabilization rails, which may likewise be magnetic (or, in some embodiments, may be ferritic). Magnetic attraction between the injector magnets and the stabilization rails may prevent the frame from rotating during its lateral motion along the shaft. Further, because the injector magnets and stabilization rails need not touch one another, they may not generate friction that would otherwise oppose the lateral motion of the frame along the shaft. This lack of friction may permit the frame to reach higher velocities in the same amount of travel, thereby generating a greater haptic output than if friction-inducing stabilizing structures were employed.

Generally, and as described below, the injector magnets, stabilization rails, and at least portions of the housing may create magnetic return paths that control and/or focus the magnetic flux of the central magnet array and/or the coil. These magnetic return paths may reduce the amount of flux that extends beyond the housing and thereby enhance the magnetic field within the housing that, in turn, may enhance the velocity that the central magnet array may reach within a given period of time or given distance of travel. The injector magnets (described below) may likewise exert an electromotive force on the central magnet array, enhancing or adding to that generated by the coil and thus enhancing the overall operation of the actuator.

FIG. 1 generally depicts a sample electronic device 100 that may incorporate a linear actuator, as described herein.

The sample electronic device 100 is depicted as a smart phone. It should be appreciated that the sample electronic device 100 is provided as only one example of a device that may incorporate a linear actuator as discussed herein. Other sample devices include tablet computing devices, laptop or other portable computers, input peripherals (such as keyboards, mice, joysticks, track pads and the like), wearable electronic devices, including glasses, watches, health monitoring devices, and so on.

Typically, although not necessarily, the sample electronic device 100 may include a number of different components within the exterior housing 110. Sample components include one or more processing units (which may be multithreaded or multicore), memory and/or other data storage, one or more batteries, physical support structures, sensors (including position, acceleration, gyroscopic, ambient light, motion, audio, and so on), cameras, speakers, microphones, and the like. These components are not illustrated in FIG. 1 for purposes of simplicity and clarity.

Likewise, a user, wearer or other entity may access from one or more input mechanisms from outside the housing 110. For example, an input button 120 is shown in FIG. 1. Touch-sensitive surfaces, such as display 130, may also function to provide user input. These input mechanisms may be used to provide input to the electronic device 100. As one example, an input mechanism may be used to acknowledge an alert or other haptic output provided by embodiments of an actuator as described herein.

FIGS. 2-6 depict one embodiment of a linear actuator 200. It should be appreciated that the embodiment shown in FIGS. 2-6 is one sample embodiment with a sample configuration; alternative embodiments may have different shapes, structures, configurations, components and the like. Accordingly, the figures and associated discussion should be understood as examples, rather than limiting.

Figure 2:
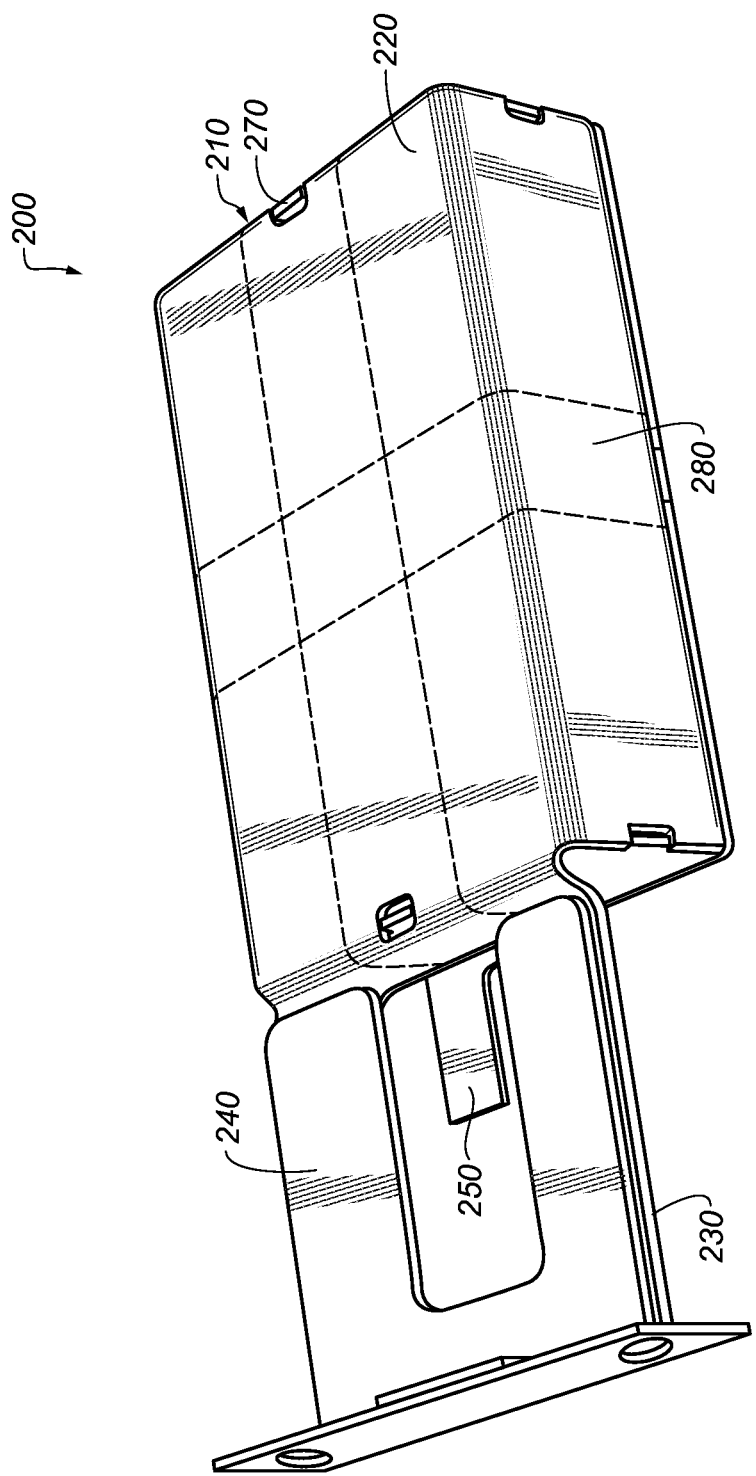
FIG. 2 depicts a sample linear actuator, in accordance with embodiments described herein.

Turning now to FIG. 2, the linear actuator 200 may have a body 210 encompassed by a case 220. The case 220 may extend to form a bracket 230, which may connect to a housing 110 of the electronic device 100. Motion of the moving mass assembly (discussed with respect to FIGS. 3-6) may be transferred to the case 220, as described below, and through the bracket 230 to the housing 110. In this manner the moving mass assembly's motion may create a user-perceptible motion of the housing. Such motion may be selective, affecting only a portion of the housing or concentrated in a portion of the housing 110, or may broadly affect the housing as a whole. In either event, the linear actuator 200 may thus produce a haptic output that may be used as an alert or notification to a user.

The linear actuator 200 may be relatively compact, making it particularly suitable for use in small electronic devices. In one embodiment, the volume of the actuator (e.g., the volume of the case and all space inside the case) is no more than 568 cubic millimeters.

A stiffener 240 may be affixed or otherwise placed on the bracket 230. The stiffener 240 may be adhered, welded, mechanically fastened, or otherwise connected to the bracket 230. The stiffener 240 may strengthen the bracket 230. By stiffening the bracket 230, the stiffener 240 may permit more motion of the moving mass assembly and associated frame to be transmitted to the housing 110 to which the bracket 230 is affixed.

A flex 250 may extend through the case 220 to provide electrical connections for components within the case 220. Some embodiments may omit the flex 250 and may instead provide electrical contacts on the exterior of the case 220, or may use a rigid connector in place of the flex 250.

The case 220 may be formed from multiple sidewalls that are attached or affixed to one another or may be formed as an integral unit that is bent or otherwise formed into the shape of the case 220. As shown in FIG. 2, protrusions 270 formed on certain sidewalls of the case may clip or snap, be laser-welded or otherwise positioned/affixed into apertures formed on adjacent sidewalls of the case, thereby maintaining structural integrity during operation. These protrusions 270 mechanically interlock the sidewalls of the case, thereby assisting in constraining the sidewalls with respect to the housing. As also shown in FIG. 2, the bracket 230 may be unitarily formed with at least one sidewall of the case 220, although in alternative embodiments the bracket 230 may be separately formed and affixed to the case.

Figure 3:
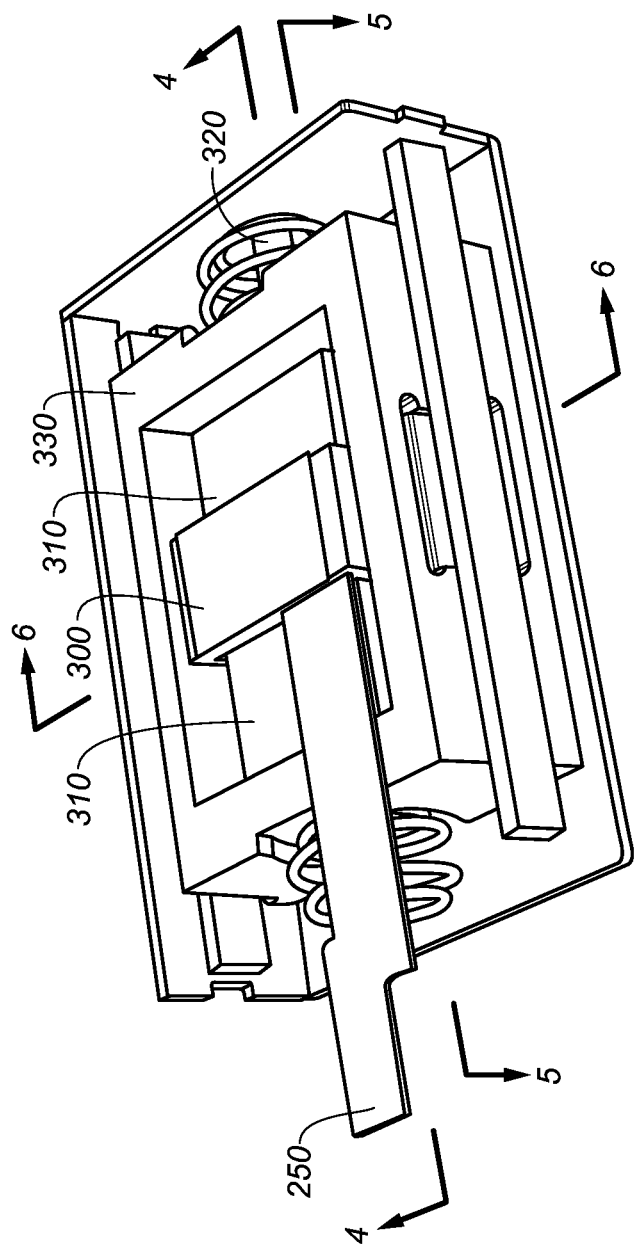
FIG. 3 depicts the sample linear actuator of FIG. 2 with a portion of a housing removed therefrom.

FIG. 3 is a three-quarters perspective view of the linear actuator 200, with a top, front and left sidewall of the case 220 removed to expose internal components. As shown in FIG. 3 and also in FIG. 6, a coil 300 encircles a central magnet array 310, which may form a moving mass assembly in conjunction with a frame 330. The coil 300 may be energized by transmitting a current along the length of the wire forming the coil; the direction of the current flow determines the direction of the magnetic flux emanating from the coil in response to the current. As discussed later, passing a current through the coil may cause the central magnet array 310 (and thus the assembly) to move along a shaft 320. In order to prevent the central magnet array 310 from being attracted to the shaft 320, which could increase friction between the two and thereby increase the force necessary to move the central magnet array 310 and frame 330, the shaft 320 may be formed from a non-ferritic material such as tungsten, titanium, stainless steel, or the like.

Figure 4:
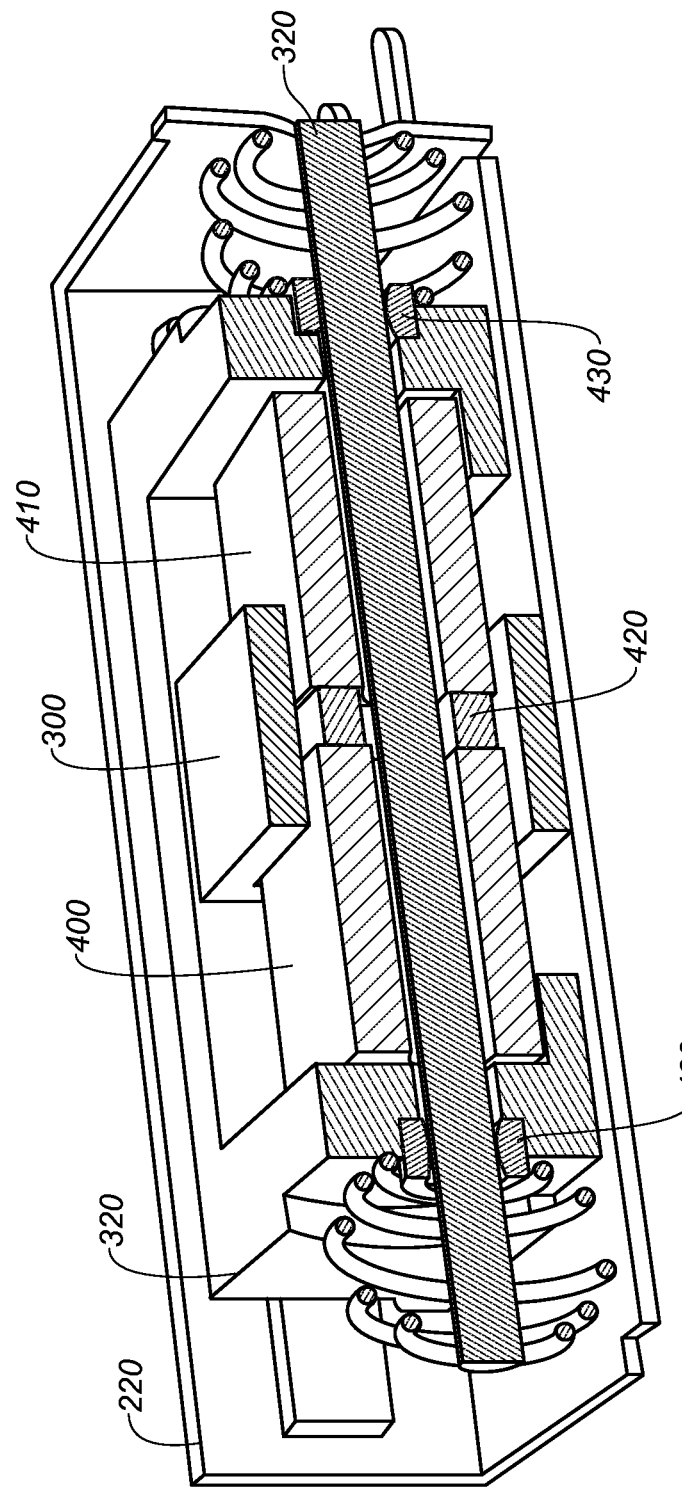
FIG. 4 depicts a cross-section of the sample linear actuator of FIG. 2, taken along line 4-4 of FIG. 3, with the flex removed for clarity.

As depicted in FIGS. 3 and 4, the coil 300 is positioned within a frame 330 that holds the central magnet array 310, but is not affixed to the coil. Rather, an air gap separates the coil 300 from the central magnet array 310 and the frame 330 is free to move with respect to the coil 300, which is generally stationary. Further, the frame 330 generally moves with the central magnet array as part of the moving mass assembly. As illustrated in FIGS. 3 and 4, the frame may have an aperture formed therein of sufficient size to contain the coil 300. Even when the frame and central magnet array are maximally displaced within the case 220 (e.g., to one end or the other of the shaft 320), the coil 300 does not abut any portion of the frame 330. It should be appreciated that the coil 300 remains stationary in the case 220 while the frame 330 and central magnet array move, although in other embodiments the coil 300 may move instead of, or in addition to, the frame and/or central magnet array. By keeping the coil stationary, it may be easier to provide interconnections for the coil, such as between the coil and the flex, and therefore reduce the complexity of manufacture.

Figure 5:
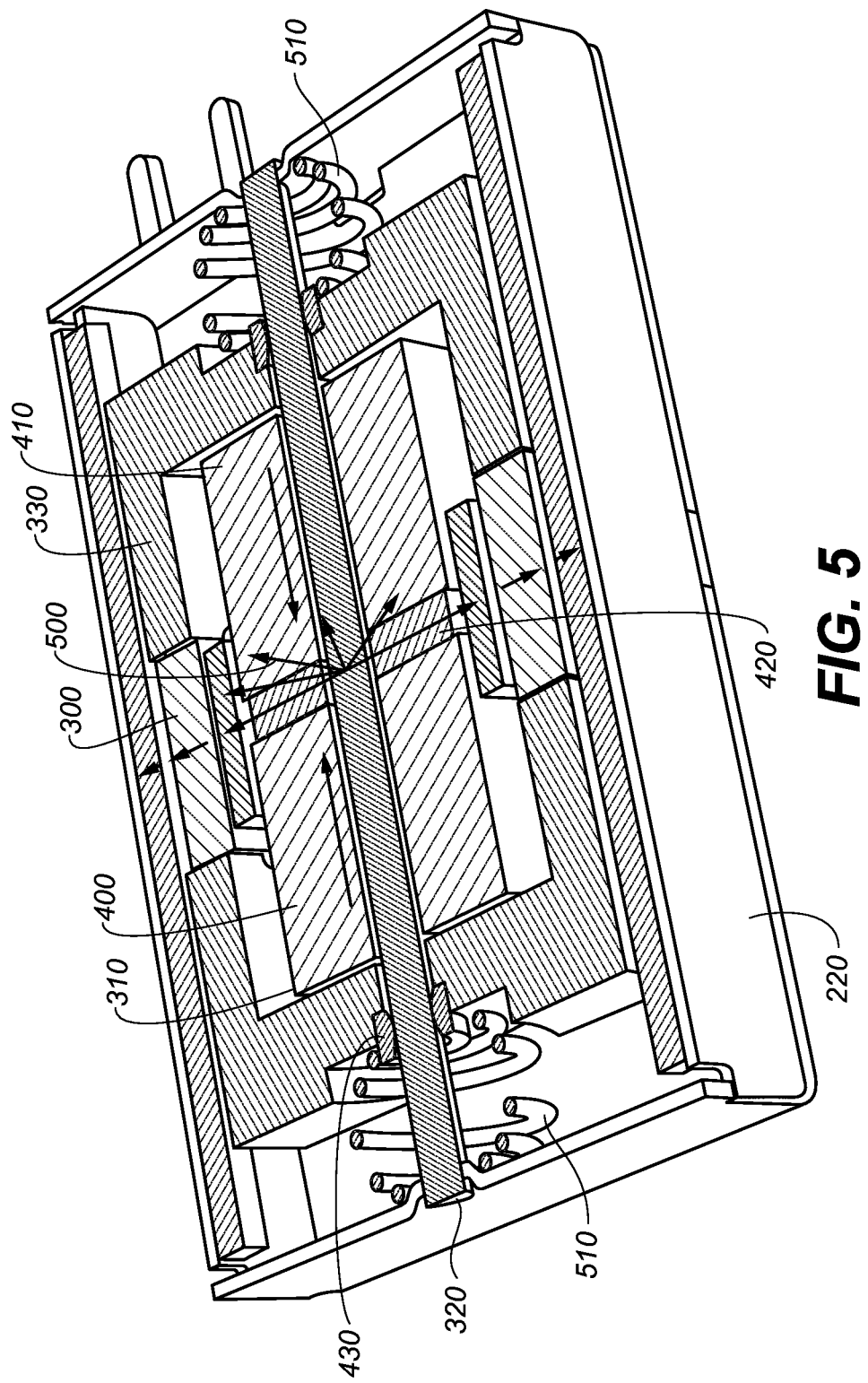
FIG. 5 depicts a cross-section of the sample linear actuator of FIG. 2, taken along line 5-5 of FIG. 3.

As shown to best effect in FIGS. 4 and 5, the central magnet array 310 may be formed from at least two magnets 400, 410 of opposing polarities. A center interface 420 may be formed from a ferritic or non-ferritic material, depending on the embodiment. A ferritic material for the center interface 420 may enhance the overall magnetic field generated by the central magnet array 310, provide at least a portion of a return path for magnetic flux and thus assist in localizing the flux within the case 220. In many embodiments, the magnets 400, 410 are neodymium while the frame is tungsten. This combination may provide a strong magnetic field and a dense mass, thereby yielding a high weight per volume structure that may be used as the moving part of the linear actuator 200.

Figure 6:
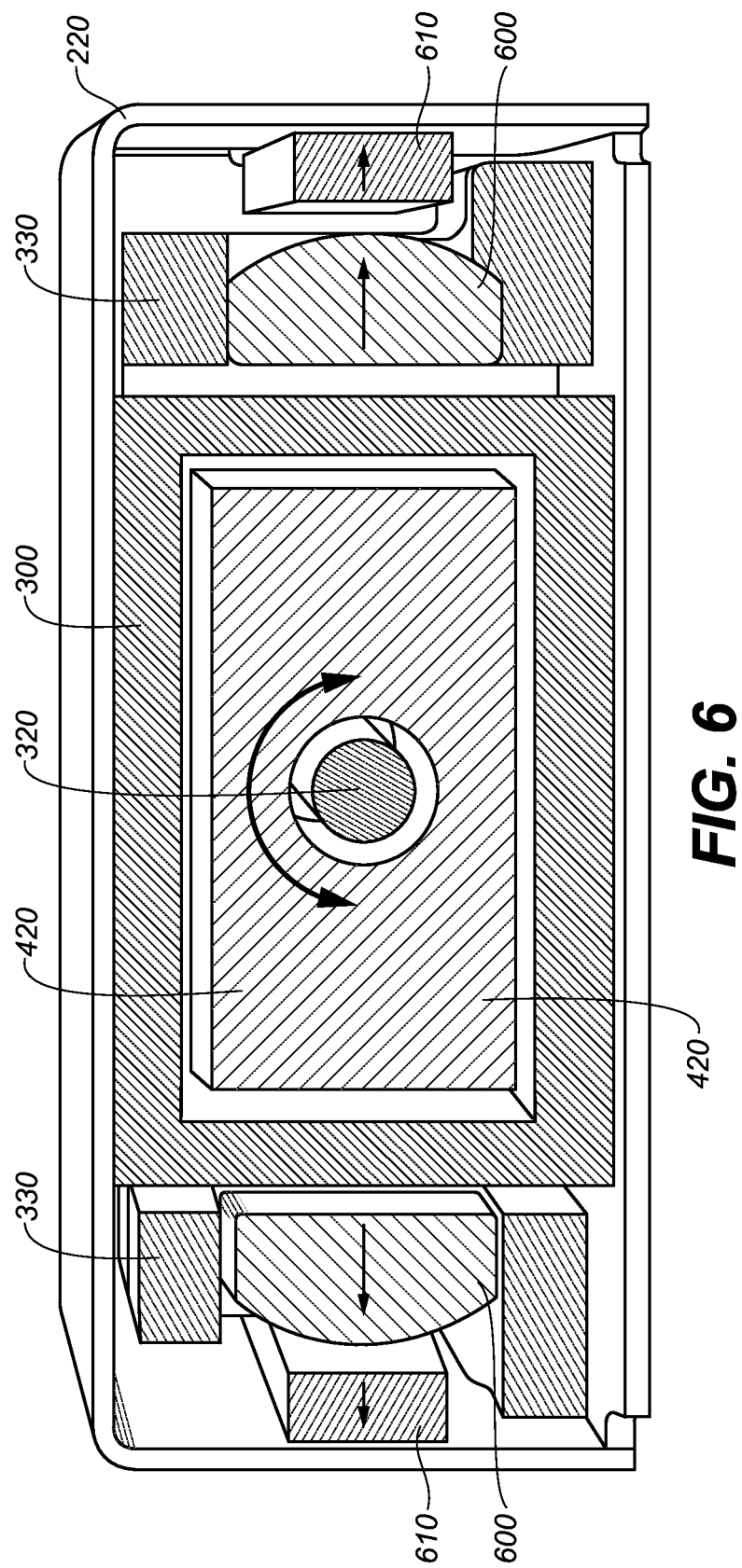
FIG. 6 depicts a cross-section of the sample linear actuator of FIG. 2, taken along line 6-6 of FIG. 2.

As shown to best effect in FIGS. 5 and 6, the magnets 400, 410, frame 330, and center interface 420 may have a hole formed therethrough to receive the shaft 320. As also illustrated in FIGS. 5 and 6, the shaft generally does not touch the magnets 400, 410, frame 330 or shaft 320, all of which are supported on the shaft by the jewel bearings 430 in order to reduce friction.

Generally, when the coil 300 is energized, it creates a magnetic field. The opposing polarities of the magnets 400, 410 generate a radial magnetic field (as illustrated by the radial magnetic field 500 in FIG. 5) that interacts with the magnetic field of the coil. The Lorentz force resulting from the interaction of the magnetic fields with the current through the coil moves the central magnet array 310 and frame 330 along the shaft 320, insofar as the coil is fixed with respect to the case of the actuator. Reversing current flow through the coil 300 reverses the Lorentz force, and thus the force on the central magnet array and frame. Thus, the array and frame may move in both directions along the shaft, depending on the direction of current flow through the coil. Further, the injector magnets may also create a flux through the coil, thereby resulting in, or enhancing, a Lorentz force.

Accordingly, when the coil is energized, the central magnet array 310 will slide along the shaft 320 in one direction or its opposite, depending on the polarity of the field. If the current through the coil 300 is sufficiently high, the central magnet array and associated frame 330 will move rapidly and reach a high velocity. If the coil is de-energized before the central magnet array moves too far (for example, before the central magnet array no longer underlies the coil), then the Lorentz force exerted on the central magnet array is reduced to zero and the frame/magnet array may continue to move.

In some embodiments, after a target velocity or displacement is reached the coil may be energized in a direction opposite its energization. This may cause the generated magnetic field to exert a force in a direction opposite the initial motion of the central magnet array and/or frame, thereby slowing down or braking the moving mass assembly. This may be useful to control or limit oscillation, especially at or near a resonance frequency of the linear actuator 200, or to maintain such a resonance frequency. Accordingly, the coil 300 can not only "pull" but can also "push" the moving mass assembly, hereby imparting motive force in two opposing directions through selective application of the coil's magnetic field. This may permit fine control over motion and/or velocity of the frame 330 and central magnet array 310, both in multiple directions and when compared to other linear actuators.

Turning now to FIG. 4, the jewel bearings 430 encircle the shaft 320 and are affixed to the frame 330, thereby forming an interface between the shaft and frame. As shown in FIG. 4, the jewel bearings 430 have a generally convex inner surface to minimize contact with the shaft 320. This, in turn, may reduce or minimize friction between the jewel bearings 430 and shaft 320, such that a higher peak velocity may be reached in a set time by the frame 330 and central magnet array 310 than might be achieved if the bearings had greater surface contact with the shaft. The jewel bearings 430 are affixed to the frame 330 and move with the frame along the shaft 320.

It should be appreciated that the jewel bearings 430 may have other surface configurations designed to reduce contact and/or friction between the bearings and the shaft and to reduce the likelihood of binding and/or friction resulting from misaligned components. For example, the inner surface of the bearings may be angled, elliptical, or the like. In addition, bearings other than jewel bearings 430 may be used in different embodiments.

The shaft 320 has been generally discussed with respect to the motion of the central magnet array 310 and frame 330. The shaft 320 may be affixed to opposing sidewalls of the case 220, as generally shown in FIG. 5. As also shown in FIG. 5, in some embodiments the shaft 320 may extend through one or more sidewalls of the case 220. In other embodiments, the shaft 320 may be fully contained within the case.

Generally, the shaft passes through the central magnet array 310, including the center interface 420 and both magnets 400, 410. The shaft 320 likewise passes through the frame 330, which is affixed to the central magnet array (and, in some embodiments, more particularly to the magnets 400, 410). The shaft extends through a spring 510 at either of the shaft's ends before passing through the case 220, or otherwise being affixed to the case 220.

Typically, although not necessarily, the shaft 320 defines a central axis along one direction of the linear actuator 200. As illustrated in FIG. 5, the shaft 320 is centrally positioned within the linear actuator 200 and runs parallel to a longitudinal axis of the linear actuator 200 (e.g., left to right in the position shown in FIG. 5). The shaft need not be coincident with a center axis of the linear actuator 200, but in some embodiments such coincidence facilitates even distribution of mass about the shaft in order to maximize a haptic output of the linear actuator 200.

As previously mentioned and as also illustrated in FIG. 5, each end of the shaft 320 passes through a spring 510. In the embodiment shown in FIGS. 2-6, each spring 510 is a double beehive spring. In many embodiments, the double beehive spring shape serves multiple purposes, including: providing a large working travel range while collapsing to a small size, thereby enhancing overall possible displacement of the moving mass assembly; distributing stresses, thereby enabling the springs themselves to be smaller than may otherwise be the case; and/or centering the spring ends on both an end plate and the bearing, thus avoiding or reducing friction resulting from coils rubbing on the shaft or housing.

The double beehive springs 510 typically abut or are affixed to both an inner surface of the case 220 and a side of the frame 330. Thus, as the frame 330 and central magnet array 310 move along the shaft in response to a Lorentz force generated through the interaction of the magnetic flux of the central magnet array and the current through the coil, one double beehive spring 510 structure expands and one compresses from its nominal rest state. When fully compressed, the windings of the double beehive spring 510 lie flat within a plane. The pitch between the windings of the spring may vary in order to accommodate the windings in a flat, coplanar position upon compression. Further, by sizing both springs to always be in compression, the springs act in tandem to double the spring rate. Additionally, the compression springs may not require attachment or affixing to a sidewall or other part of the actuator, thereby avoiding possible complexities, variability and stresses caused by such attachment.

Accordingly, the double beehive spring 510 may be space-efficient and designed to occupy a minimum volume when fully compressed. By reducing the volume or the springs when in a compressed state, or at least their thickness along a dimension parallel to the shaft 320, the distance the moving mass assembly may move along the shaft, the size of the central magnet array 310, and/or the amount of mass may be increased when compared to a spring that does not collapse to place its windings within a plane.

The springs 510 may prevent the frame 330 from impacting a sidewall of the case 220 when the frame 330 moves at a high velocity or enjoys a large displacement. Further, the coil 300 may be energized in order to move the frame 330 and central magnet array 310 along the shaft 320, thereby further compressing one of the springs 510. (It should be appreciated that the springs 510 are always in compression in the depicted embodiment). Current may be maintained through the coil 300 to bias the central magnet array 310 and frame 330 into a displaced position, thereby further compressing a spring 510 and storing energy in the spring. When current to the coil is terminated, the external force exerted on the central magnet array 310 may likewise terminate. In response the spring 510 may expand, propelling the moving mass assembly away from the spring 510 and along the shaft 320. Current may flow through the coil 300 at the appropriate time to impart more motive force to the moving mass assembly, thereby increasing the velocity of the assembly and enhancing the haptic output generated by this moving element. Accordingly, the springs 510 may be used to convert kinetic energy to potential energy, thereby enabling the actuator to achieve a greater amplitude of momentum across multiple cycles of operation, and so create an enhanced or increased haptic sensation for a user or wearer when compared to the haptic sensation that may be (at least initially) experienced if the moving mass assembly is in the neutral, or rest, position as illustrated in FIG. 5.

Embodiments of a linear actuator 200, as described herein, may include one or more injector magnets 600, as shown in FIGS. 2-6 generally and specifically discussed with respect to FIG. 6. Each injector magnet 600 may be affixed to a side of the frame 330, and may be positioned such that a back side of the injector magnet is near an outer surface of the coil 300, but separated therefrom by a gap (which may be an air gap). An outer surface of each injector magnet 600 may be curved or otherwise arcuate, or may be angled, taper to a point, elliptical, or the like; the injector magnets may likewise be shaped to increase or decrease the stabilization provided by the injector magnets, as generally discussed below.

A pair of rails 610 may be affixed to an interior of the case 220 and positioned such that each rail 610 is generally near an injector magnet 600. The rails 610 may be magnetic, in which case their polarities match the polarities of the nearby injector magnets (e.g., magnetic attraction exists between each rail 610 and the nearby injector magnet). Alternatively, the rails 610 may be made of a ferritic material but may not be magnets themselves, such that the injector magnets 600 are attracted to the rails 610. In alternative embodiments, the rails 610 may be magnetic and the injector magnets may be replaced with ferritic masses. The arrows shown on the injector magnets and rails in FIG. 5 indicate the direction of magnetic flux through the magnets and rails, respectively.

The injector magnets 600 serve three purposes, namely to stabilize the moving mass assembly during motion along the shaft, such that the assembly does not rotate substantially about the shaft, to provide additional flux through the coil 300 (and so increase the motive force acting on the moving mass assembly) and also to provide a magnetic flux path for the magnetic fields generated by the coil and central magnet array. The first purpose will be initially discussed. It should be appreciated that the double-headed arrow shown in FIG. 6 illustrates potential rotational motion of the central magnet array and frame about the shaft; this is the rotational motion that is resisted by the injector magnets and rails 610.

The convex shape of the injector magnet 600 helps ensure that the outermost part of the injector magnet 600 (e.g., the part closest to the rail 610) is attracted to the rail 610. Further, if the frame 330 assembly rotates or spins about the shaft 320 during movement such that it is angularly misaligned, the convex shape of the exterior portion of the inject magnet reduces the likelihood that the injector magnet will be attracted to any ferritic or magnetic portion of the case 220, as compared to an injector magnet having a rectangular or square cross-section. Rather, the attraction between the injector magnet 600 and rail 610 tends to maintain the injector magnet's alignment with respect to the rail 610 in such a manner that the injector magnet remains substantially parallel to the rail 610, in the position shown in FIG. 6. Thus, even if the frame and injector magnets become rotationally misaligned about the shaft, the injector magnets 600 operate to realign the frame, central magnet assembly and themselves with respect to the rails 610 and thus with respect to the shaft. The injector magnets essentially provide roll stability for the moving parts of the actuator and may permit implementation of non-axially-symmetric actuator sections that are stable without requiring addition mechanical constraints, which generally may occupy volume within the actuator and/or may add friction to the system.

This self-realigning action may prevent the frame 330 from binding on the shaft 320 and may maintain the frame and central magnet array 310 in a position with respect to the shaft that is configured for low-friction and/or lower-power motion of the frame along the shaft. Further, because the injector magnets 600 do not physically contact the rails 610, there is no friction between the two, thereby reducing the overall friction of the system while maintaining the roll stability and self-aligning features of the moving parts of the actuator (e.g., injector magnets 600, frame 330, and central magnet array 310).

Because the strength of a magnetic field varies non-linearly with the distance between two magnets, or a magnet and a ferritic material, the stabilization provided by the injector magnets 600 and rails 610 is non-linear. That is, the closer the injector magnets 600 are to their stable position (e.g., the position illustrated in FIG. 6), the stronger the force maintaining them in that stable position. Accordingly, even if the moving parts of the actuator become misaligned, any oscillation or motion that brings the injector magnets 600 near the rails 610 will cause the injector magnets 600, and thus the frame and so on, to quickly return to the stabilization position.

It should be appreciated that alternative embodiments may use a repulsive magnetic force, rather than an attractive magnetic force, to center the moving parts of the linear actuator 200 and prevent roll around the shaft 320. For example, magnetic rails 610 of polarities that oppose the polarities of the injector magnets 600 may be placed at the top and bottom of the case, substantially in vertical alignment with the injector magnets or along the joinder of the top of the case to a sidewall. Such magnetic rails 610 may repulse the injector magnets and cooperate to maintain the injector magnets in a stable position, so long as the strength of the magnetic fields is appropriately configured. Accordingly, embodiments are not limited to employing an attractive magnetic force to provide centering and stabilization.

The case 220 may be formed entirely from non-ferritic materials in certain embodiments, while in other embodiments the case 220 may be formed from a combination of ferritic and non-ferritic material. As one example and returning to FIG. 2, the case 220 may have a segment 280 that is ferritic in order to provide a return path through the case 220 for magnetic flux. The segment 280 may take the form of a cross as illustrated in FIG. 2. Further, the segment 280 may extend downwardly along sidewalls of the case 220 to enhance the flux return pathways. As another example, the segment 280 may be a stripe running substantially parallel to the shaft and may extend downwardly to the points at which the case 220 is affixed to the shaft.

The flux return path serves to contain the magnetic flux and prevent leakage substantially beyond the case 220 of the linear actuator 200. For example, the radial magnetic field 500, shown in FIG. 5, may extend through and be bound by the ferritic portions of the case 220 to complete a loop to the outer edges of the magnets 400, 410. Another sample flux return path may be formed through the injector magnets 600, the rails 610, and along the ferritic parts of the case 220. Generally, then, the case 220 may be configured to facilitate the formation of magnetic circuits that define flux return paths. These flux paths may also facilitate efficient transfer of energy to the moving mass, thereby increasing its velocity and haptic output during operation.

In some embodiments, the frame 330 is formed from a ferritic tungsten alloy to create another flux return path and also maintain a volume-to-mass efficiency (e.g., high mass per unit volume).

FIGS. 7-16 depict various views of another embodiment of a linear actuator 700. Generally the linear actuator 700 shown in FIGS. 7-10 operates to provide a haptic output in a fashion similar to that previously described with respect to FIGS. 1-6. That is, an electromotive force acts to move a mass linearly within a housing; the motion of the mass may be perceived by a user as a tap or other haptic output. The electromotive force may be generated by one or more coils and one or more magnets, as described above.

Here, however, the structure and certain specifics of operation may differ from previously described implementations. Particular details of the linear actuator 700 will now be given with respect to FIGS. 7-16, and initially with respect to FIGS. 7-10.

Figure 7:
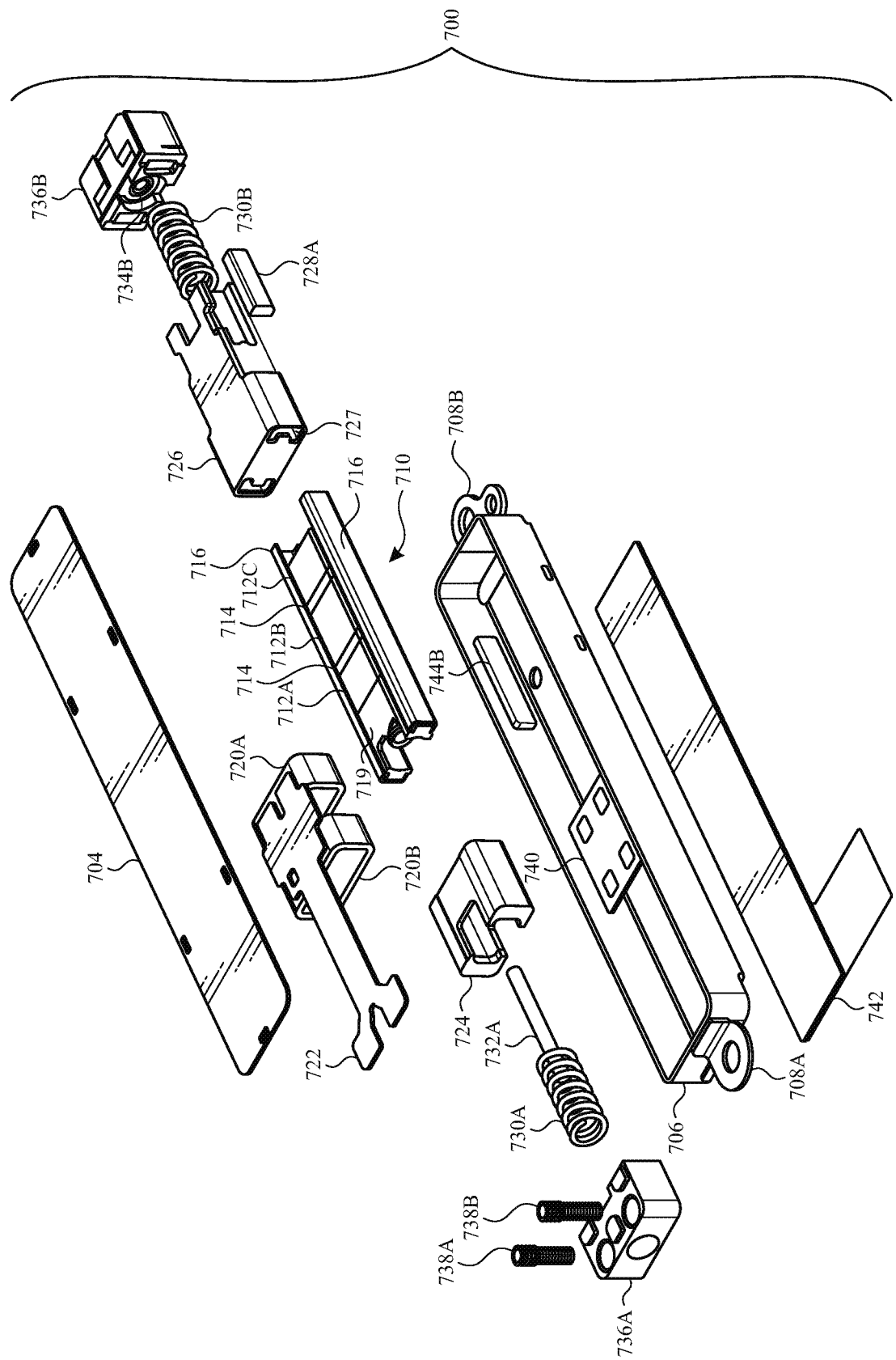
FIG. 7 depicts an exploded view of another sample linear actuator.
Figure 8:
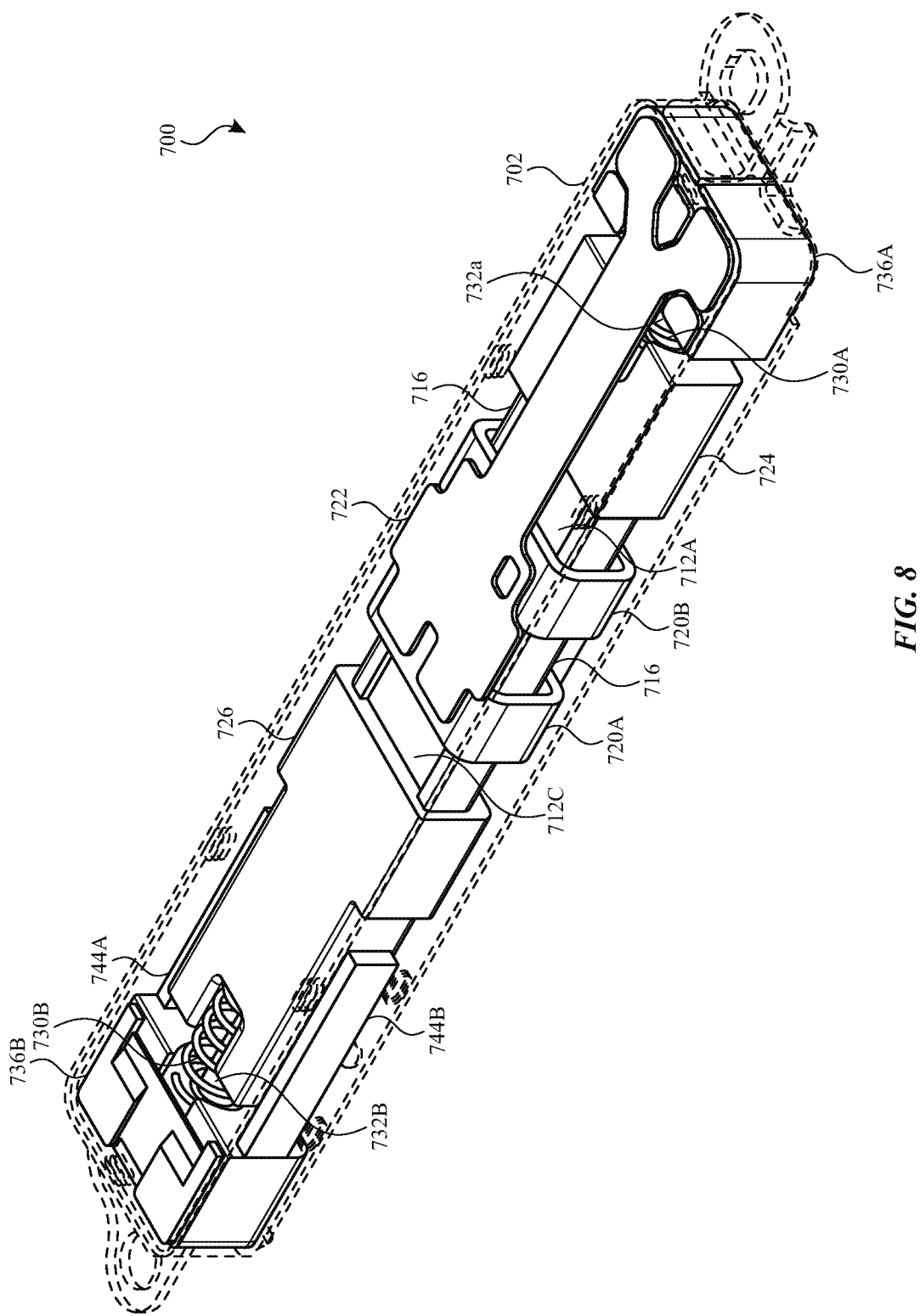
FIG. 8 depicts the linear actuator of FIG. 7 in an assembled state, with the housing shown in phantom.
Figure 9:
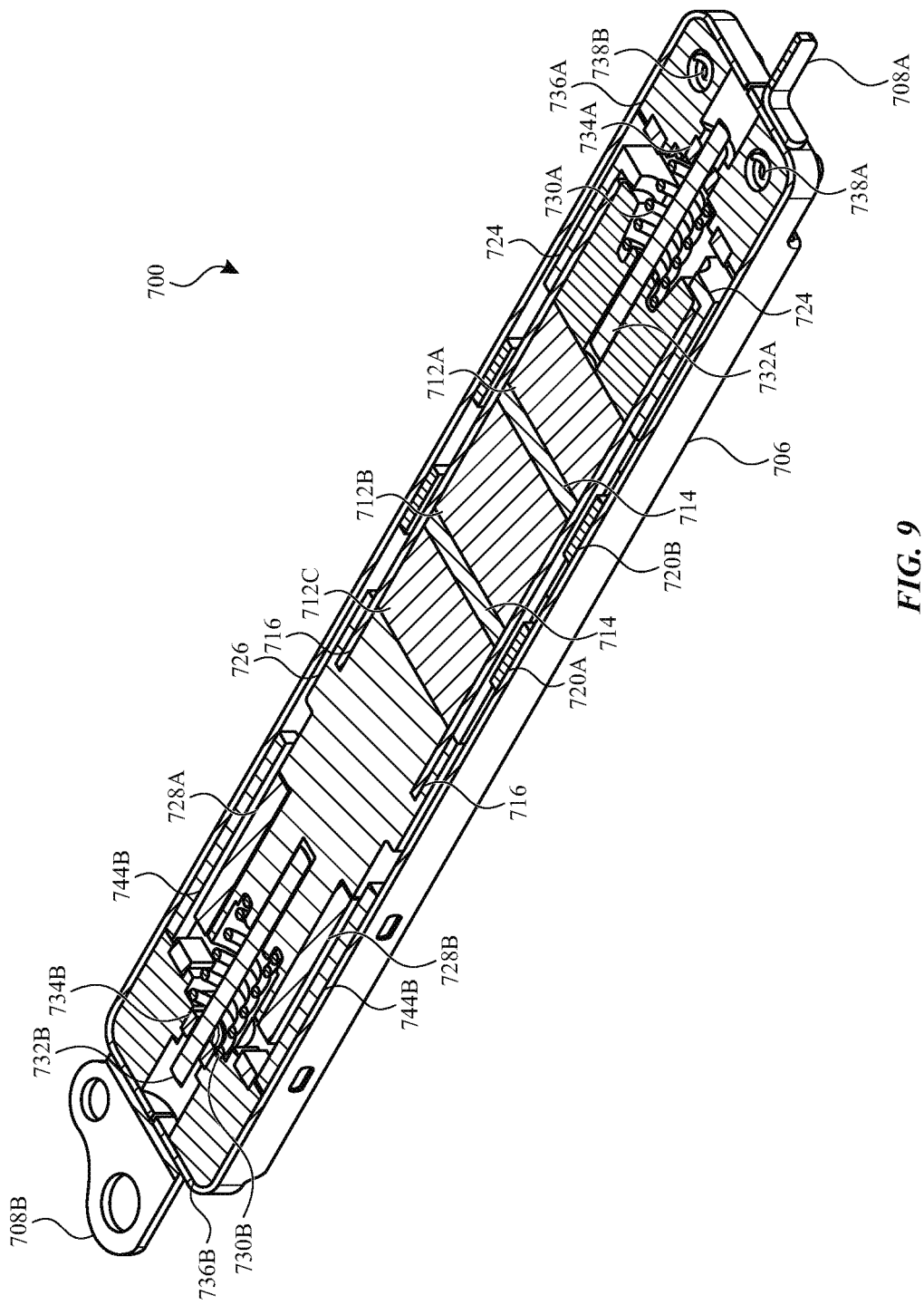
FIG. 9 shows a first cross-section of the linear actuator of FIGS. 7 and 8.

FIG. 7 depicts an exploded view of a linear actuator 700 and FIG. 8 depicts an assembled view of the linear actuator. FIG. 9 illustrates a first cross-sectional view of the linear actuator 700, while FIG. 10 illustrates a second cross-sectional view. The overall structure and configuration of the linear actuator 700 is initially discussed with respect to these figures.

A housing 702 forms an exterior of the linear actuator 700 and protects internal components. The housing 702 includes a first housing section 704 and a second housing section 706. Generally, the second housing section 706 forms five of the six housing walls while the first housing section 704 forms the sixth housing wall, although this is not required or necessary and may vary between embodiments. Housing connectors 708a, 708b may be attached to opposing ends of the housing and may affix the housing to an electronic device incorporating the linear actuator 700. The housing connectors 708a, 708b may be welded, chemically bonded, mechanically fastened, or otherwise affixed to the housing 702 (and typically the second housing section 706). The housing 702 and its attendant sections 702, 704 may be formed from any suitable material, and are often formed from a metal.

A magnet assembly 710 includes a series of three magnets 712A, 712B, 712C, spacers 714, and an end mass 719 (and, in some embodiments, a main mass 726). Adjacent magnets are separated from one another by spacers 714. That is, first magnet 712A is separated from second (or center) magnet 712B by a first spacer, which in turn is separated from third magnet 712C by another spacer 714. In some embodiments the spacers may be ferromagnetic and/or may have relatively high magnetic permeability. In other embodiments the spacers may have low magnetic permeability. Further, the spacers may serve to redirect a lateral magnetic field (e.g., a field parallel to the center axes of the shafts 723A, 723B) or flux generated by the magnets 712A, 712B, 712C as a radial field or flux (e.g., a field transverse to the longitudinal cylindrical axes of the shafts 732A, 732B, as discussed below). Thus, the spacers may act as field return elements, although this again is not required or necessary. Each adjacent pair of the magnets 712A, 712B, 712C may have opposing polarities.

A pair of rails 716 receives the series of magnets 712A, 712B, 712C and spacers 714 between them. The rails 716 may be C-shaped in some embodiments and as illustrated in FIGS. 7 and 8; the legs of the C-shaped rails fit about outer edges of the magnets and spacers. The spacers and magnets may be angled, stepped, or otherwise dimensioned so that their outer edges fit within the rails. Generally, the rails 716 hold the magnets and spacers in alignment and abutting one another.

The rails 716 may also surround an end mass 719 that abuts the first magnet 712A. The end mass may increase the force of a haptic response (and thus its perceptibility) provided by the linear actuator 700, presuming that acceleration of the moving portion of the linear actuator is equal when the end mass 719 is present and when it is not. The motion of the moving portion is described in more detail, below.

Coils 720A, 720B may encompass portions of the series of magnets 712A, 712B, 712C and the spacers 714. The coils 720A, 720B may further encircle the rails 716, or portions thereof. Typically, the coils are positioned with respect to the magnet assembly 710 such that a center of each coil is substantially aligned with a spacer 714 when the linear actuator 700 is at rest (e.g., the magnet assembly 710 is in a default position). In such an alignment, magnetic flux or fields generated by the coils are not countered, enhanced, diminished or otherwise affected by an offset between either coil and the amount of each magnet overlapped o encircled by the coil. That is, because each coil encircles substantially the same amount of each of two adjacent magnets, there is no positional bias between coils and magnets that would impact the generated electromotive force, either positively or negatively.

It should be noted that the magnets may be off-center (e.g., not evenly spaced between) the end mass 719 and the main mass 726. Accordingly, the magnets and coils 720A, 720B are not centered about a midpoint of the housing. Further, in some embodiments the end mass and the main mass may be formed from different materials, such that they have approximately the same weight and/or mass as one another, despite being different sizes. In other embodiments, the main and end masses may be formed from the same material, such as tungsten.

A flexible circuit 722 routes electrical signals (power, control, and/or data) to the coils from a processing unit or similar element of an electronic device. The processing unit is typically positioned outside the linear actuator 700. As discussed in more detail below, electrical end contacts 738A, 738B may route such signals to the flexible circuit from an exterior of the linear actuator 700. It should be appreciated that a processing unit or like element may be housed within the linear actuator in some embodiments, and thus provide localized control.

An array cap 724 slides over and end of the magnet assembly 710, and more particularly over part of the rails 716 and end mass 719. In some embodiments the array cap 724 may be longer, such that it covers at least a portion of one or more magnets and/or spacers. The array cap 724 typically has end walls, as shown in FIG. 7, that abut ends of the spacers 714 and/or the end mass 719 when the array cap 724 is fitted to the magnet assembly 710. Accordingly, the array cap 724 may prevent the components of the magnet assembly from sliding apart and/or out of the rails, at least at one end of the assembly.

A main mass 726 couples to an end of the magnet assembly 710 opposing the end over which the array cap 724 fits. The main mass 726 accepts ends of the rails 716 through C-shaped (or rail-shaped) apertures 727 formed in the mass. These apertures are shown to best effect in FIG. 7. The rails slide into the apertures in the main mass 726 until the main mass contacts the third magnet 712C. Accordingly, the main mass may prevent the series of magnets 712A, 712B, 712C and spacers 714 from shifting or decoupling, much as does the array cap 724 at the opposite end of the magnet assembly 710.

Injector magnets 728A, 728B are affixed to opposing sides of the main mass 726. As with the injector magnets 600 of the prior embodiment, these injector magnets 728A, 728B serve three purposes. They: 1) stabilize the moving portion assembly during motion along the shaft, such that the assembly does not rotate substantially about the shaft; 2) provide additional flux through the coils 720A, 720B (and so increase the motive force acting on the moving portion); and 3) and facilitate a magnetic flux path for the magnetic fields generated by the coil and central magnet array. Insofar as the injector magnets 728A, 728B operate in fashions similar to already-described injector magnets 600, they are not described in more detail herein.

First and second shafts 732A, 732A may extend into the magnet assembly 710 and the main mass 726, respectively. More particularly, a first shaft 732A extends through the array cap 724 and into the magnet assembly 710, typically being received by the end mass 719. Likewise, the second shaft 732B may extend into the main mass 726 but generally does not pass completely through the main mass (although it may, in alternative embodiments). The shafts may not extend into any of the magnets in the magnet assembly 710, as that would require forming a recess in the magnets. Such recesses may be difficult to form without cracking any of the series of magnets 712A, 712B, 712C. Further, hollowing or partially hollowing the magnets in this fashion may reduce the magnetic field of the magnets and thus impact the electromotive force that moves the magnet assembly 710 and masses 724, 726 when the linear actuator 700 operates. This, in turn, may reduce the force and haptic output of the linear actuator.

Ends of the shafts 732A, 732B that do not extend into the magnet assembly 710 or main mass 726 pass through bearings 734A, 734B and are received in end caps 736A, 736B. The end caps 736A, 736B each define an interior void space in which the ends of the shafts rest and may be affixed to the housing, or otherwise may be held immobile with respect to the housing. The interior void spaces are sufficiently large that the ends of the shafts do not touch walls of the void spaces. Accordingly, the shafts may translate along their major (e.g., longitudinal cylindrical) axes during operation of the linear actuator 700, as described below. In certain embodiments and as depicted herein, the void space(s) may extend through an entirety of the end cap.

A shaft spring 730A, 730B surrounds each respective shaft 732A, 732B. The first shaft spring 730A surrounds first shaft 732A; one end of the first shaft spring 732A is received within an aperture in the first end cap 736A. This same aperture houses the first bearing 734, discussed below. Likewise, the first shaft 732A passes through the aperture and into the interior void space of the first end cap 736A. Similarly, the second shaft spring 730B encircles the second shaft 732B and is received in an aperture of the second end cap 736B that leads to that end cap's interior void space. The second bearing 734B is received within the second aperture. The first and second shaft springs may be constrained at one end by a mass (e.g., either the end mass or main mass) and at another end by an end cap and/or a respective bearing. Thus, as the masses and series of magnets move (and the shafts move), the springs are compressed between an end cap and a mass.

The shaft springs 730A, 730B are configured such that their start and end points (e.g., the ends of the springs) align with one another. That is, the start and end points of each spring have a substantially zero degree angular offset from one another when viewed from either end of the spring. This may reduce torque generated by the shaft spring as the spring compresses, and consequently reduce torque on the moving portion of the linear actuator 700. Certain embodiments may utilize springs that do not have ends aligned in this manner. In some embodiments the shaft springs may be leaf springs rather than coiled springs, as shown. The shaft springs (including if leaf springs) may be welded or otherwise affixed to the end caps 736A, 736B in certain embodiments, although they may not be so affixed in others. Likewise, the shaft springs may be affixed on their other ends to adjacent structures.

Additionally, the direction in which the first shaft spring 730A is wound opposes the direction of the second shaft spring's 730B winding. By using springs having opposing windings, any torque generated by one shaft spring and exerted on the moving portion of the linear actuator (e.g., the shafts 730A, 730B, the array cap 724, the magnet assembly 710, and/or the main mass 726) may be substantially or completely countered by the torque generated and exerted by the other shaft spring. Accordingly, spring torque (if any) in the system of the linear actuator 700 may be reduced or offset.

The end caps 736A, 736B have been previously mentioned. Each end cap 736A, 736B defines an aperture leading to an interior void space. A bearing 734A, 734B is disposed within each such aperture. As previously discussed, the interior void space is sized to accept an end of a spring without the spring end contacting a wall of the interior void space while the linear actuator 700 is at rest.

The end caps 736A, 736B may be affixed to sidewalls of the housing 702. In some embodiments, the end caps are welded, mechanically coupled, chemically bonded, or otherwise so affixed. In other embodiments, the end caps may be friction-fitted within the housing. In still other embodiments, the end caps may abut sidewalls of the housing but are not affixed thereto.

End contacts 738A, 738B pass through bores formed in the first end cap 736A and through a hole in the base of the housing 702. The end contacts 738A, 738B may abut a contact patch formed on a substrate beneath the housing base. The end contacts 738A, 738B may thus route power, control signals, and/or data signals in and out of the linear actuator 700, and particularly through the flexible circuit 722 to the coils 720A, 720B. In some embodiments the end contacts 738A, 738B may be springs while in others they may be pogo pins or the like. Such compliant end contacts may absorb some tolerance or offset between the actuator 700 and the contact patch on the substrate, thereby increasing reliability of the associated electrical signals.

Stabilization rail magnets 744A, 744B may be affixed to the housing 702, and particularly to the sidewalls of the second housing section 706. The stabilization rail magnets 744A, 744B may be affixed in the same position on opposing sidewalls. Generally, the stabilization rail magnets 744A, 744B act as do the stabilization rails 610, which were previously discussed with respect to other configurations of a linear actuator.

A coil shim 740 may be placed within the housing 702 and affixed to the housing. The coil shim 740 generally maintains proper spacing of the coils 720A, 720B, particularly with respect to the magnets 712A, 712B, 712C and/or housing 702. The coil shim 740 may ensure that the coils do not physically touch either the housing or the magnets, for example. In certain embodiments, the coil shim 740 may be electrically nonconductive.

A support pad 742 may be placed between the base of the housing 702 and a substrate supporting the housing (for example, an internal structural component of an electronic device, or a housing of an electronic device). The support pad may absorb residual or unwanted motion of the linear actuator 700 with respect to the housing, thereby preventing or reducing rattles or other undesirable noise. The support pad 742 may also act as a shim for the linear actuator 700 with respect to the substrate.

FIG. 11 is a cross-sectional view taken along line 11-11 of FIG. 10 and through the end contacts 738A, 738B and the end cap 736A. As shown, the end contacts 738A, 738B may extend through the end cap 736A and an aperture in the housing 702 to contact an electrical contact pad, as previously discussed. FIG. 11 also illustrates an end of the first shaft 732A received in the interior void space 1000. As can be appreciated from the figure, the diameter of the shaft 732A is less than the diameter of the interior void space 1000.

FIG. 12 is a cross-sectional view taken along line 12-12 of FIG. 10, through the assembly cap 724, magnet assembly 710 and first shaft 732A. The assembly cap encircles the rails 716, which in turn hold the end mass 719. The first shaft 732A extends into the assembly cap and the end mass. As shown, the end mass 719 has reduced thicknesses at its sidewalls so that the sidewalls can fit within the interior of, and be held by, the rails 716.

FIG. 13 is a cross-sectional view taken along line 13-13 of FIG. 10, through a coil 720A and the magnet assembly 710. This view illustrates how the coil encircles the rails 716 and the magnet 712C. The flex 722 is shown above and contacting the coil. As with the end mass 719 shown in FIG. 12, the magnet 712C (and all magnets in the magnet assembly) have reduced thicknesses at its sidewalls in order to fit within the rails 716.

FIG. 14 is a cross-sectional view taken through the main mass 726 and along line 14-14 of FIG. 10. This cross-section illustrates the rails 716 received within the main mass 726.

FIG. 15 is a cross-sectional view taken through the main mass 726 and second shaft 732B, along line 15-15 of FIG. 10. This cross-sectional view illustrates the relative positions of the injector magnets 728A, 728B and stabilization rail magnets 744A, 744B relative to the shaft. Essentially, the injector magnets 728A, 728B and stabilization rail magnets 744A, 744B are aligned with one another and the shaft.

FIG. 16 is a cross-section view of the second shaft 732B received within the second bearing 734B and the second end cap 736B, taken along line 16-16 of FIG. 10. The second bearing 734B permits the second shaft 732B to move along the long axis of the actuator 700 while constraining motion in any other direction. The size of the interior void space defined within the second end cap 736B also permits such motion. The same is true of motion of the first shaft 732A with respect to the first bearing 734A and first end cap 736A.

Now that the overall structure of the linear actuator 700 has been described, its operation will be discussed.

Generally, the magnet assembly 710, end mass 726, and first and second shafts 732A, 732B form the moving portion of the linear actuator 700. That is, these elements may translate toward either end cap 736A, 736B when the haptic actuator 700 operates. Typically, the various parts of the moving portion move together and without separating or changing distances from one another (e.g., they move as a unitary piece).

Similar to previously-discussed embodiments, coils 720A, 720B generate a magnetic field and flux that may drive magnets 712A, 712B, 712C toward one of the two end caps 736A, 736B of the linear actuator 700. (Likewise, flux return paths for the linear actuator 700 may be generally similar to those discussed with respect to FIGS. 1-6, above, bearing in mind differences in the coil and magnet numbers and structures.) The direction of motion varies with the direction of current through the coils and it should be appreciated that current may flow in the same direction through the coils or in opposing directions. The magnets 712A, 712B, 712C move accordingly, thereby forcing the rest of the moving portion to move. Insofar as the shafts 732A, 732B are constrained by the bearings 734A, 734B, the moving portion moves only laterally along the length of the linear actuator 700. That is, the moving portion moves in a direction of the longitudinal cylindrical axis of the shafts 732A, 732B. The coils, taken collectively, are one example of an electromagnetic structure.

As the moving portion moves, one of the two springs 730A, 730B compresses. For example, as the moving portion moves toward the first end cap 736A, the first spring 730A translates further into the first end cap's interior void space 1000 and the array cap 724 translates closer to the first end cap 736A. This compresses the first spring 730A between the first end cap and the array cap. Similarly, motion of the moving portion towards the second end cap 736B compresses the second spring 730B between the second end cap and the main mass 726.

When current ceases flowing through the coils 720A, 720B (or other electromagnetic structure), the electromotive force ceases acting on the magnet assembly 710. Accordingly, there is no force driving the moving portion towards either end cap 736A, 736B. Thus, the compressed shaft spring will decompress, pushing the moving portion back towards its initial, rest location. For example, shaft spring 730A may expand (presuming the moving portion moved toward the first end cap 736A), pushing on array cap 724 to drive the moving portion back towards a center of the linear actuator 700. The second shaft spring 730B may prevent over-travel of the moving portion. Thus, the two shaft springs 730A, 730B cooperate to center (or re-center) the moving portion within the linear actuator 700. The springs may similarly cooperate to re-center the moving portion when the moving portion travels toward the second end cap 736B.

By repeatedly and rapidly energizing and de-energizing the coils 720A, 720B, the moving portion of the linear accelerator (such as magnet assembly 710) may be pushed toward one of the end caps and then returned to center. Further, the end cap towards which the moving portion is driven may alternate, thereby forcing the moving portion to oscillate laterally. This lateral oscillation may be perceived by the user as a haptic output. Further, the coils may be energized separately or simultaneously, depending on the number of different actuation stages desired. For example, both coils may be initially energized to begin motion of the moving portion. Once the moving portion moves to a certain degree, only one coil may be energized, or both coils may be again energized.

Typically, the motion of the moving portion is not so great that the shafts 732A, 732B impact any part of the end caps or housing. The shaft springs 730A, 730B may be sized and configured to fully or substantially fully compress before the shafts can travel far enough to impact any surface, for example. In other embodiments the shafts may be prevented from impacting a surface by appropriately controlling current through the coils 720A, 720B.

Although embodiments have been described herein as having two coils and three magnets, it should be appreciated that more or fewer magnets and/or coils may be used. That is, a linear actuator may have a different number of activation (and actuation) stages than described herein. Likewise, some embodiments may have a single shaft extending between end caps. As yet another option, cross-sections of the shafts (or just one shaft, or the single shaft in a single-shaft embodiment) may vary. As yet another option, some embodiments may use pogo pins in lieu of one or more springs.

Although embodiments have been described herein with respect to particular structures, circuits and operations, it should be appreciated that alternative embodiments may vary any or all of the foregoing. For example, more than two magnets may be used to form the central magnet array. Likewise, multiple coils may be used to enhance electromotive force operating on the central magnet array. The width and/or shape of either or both of the central magnet array and the coil may be varied to adjust or change a force vs. distance profile of the actuator. In still other embodiments, additional magnets may be placed at either end of the case, such that the central magnet array and/or frame pass between these additional magnets while moving. The additional magnets may be polarized to provide a restoring force that assists in moving the frame and/or array back to its rest position. In still other embodiments, the coil may be flat (e.g., planar), rather than wound around the central magnet array.

Accordingly, the proper scope of protection is defined by the appended claims and is not limited to any particular example set forth herein.

What is claimed is:

1. An actuator for an electronic device, comprising:
a housing;
a frame disposed within the housing;
multiple magnets positioned within the frame;
a set of spacers positioned within the frame, each of the spacers in the set separating two magnets of the multiple magnets;
a group of coils surrounding a portion of the multiple magnets and positioned within the frame;
a main mass affixed to a first magnet of the multiple magnets;
an end mass affixed to a second magnet of the multiple magnets;
a first shaft end of a shaft received within, and extending from, the main mass;
a second shaft end of the shaft received within, and extending from, the end mass;
a first bearing encircling the first shaft end;
a second bearing encircling the second shaft end;
a first end cap affixed to the housing and defining a first aperture;
a second end cap affixed to the housing and defining a second aperture;
a first spring around the first shaft end outside the frame and constrained by the first end cap and the main mass;
a second spring around the second shaft end outside the frame and constrained by the second end cap and the end mass; and
guide rails configured to constrain a motion of the multiple magnets, the main mass, and the end mass; wherein
the multiple magnets, the main mass, the frame, and the end mass are configured to move along the guide rails.

2. The actuator of claim 1, wherein:
the first shaft end extends into a first void defined by the first end cap; and
the second shaft end extends into a second void defined by the second end cap.

3. The actuator of claim 1, wherein:
the guide rails encompass exterior edges of the multiple magnets; and
the guide rails pass through the main mass.

4. The actuator of claim 3, wherein the guide rails are C-shaped.

5. The actuator of claim 1, further comprising a set of stabilization magnets adjacent opposing sidewalls of the housing.

6. The actuator of claim 1, wherein the first and second springs are wound oppositely from one another.

7. The actuator of claim 6, wherein the first spring is configured to counter torque from the second spring, and vice versa.

8. A method for providing haptic feedback, comprising:
energizing multiple coils of an actuator that includes:
a housing;
a frame disposed within the housing, the multiple coils positioned within the frame;
multiple magnets positioned within the frame, the multiple coils surrounding a portion of the multiple magnets;
a set of spacers positioned within the frame, each of the spacers in the set separating two magnets of the multiple magnets;
a main mass affixed to a first magnet of the multiple magnets;
an end mass affixed to a second magnet of the multiple magnets;
a first shaft received within, and extending from, the main mass;
a second shaft received within, and extending from, the end mass;
a first bearing encircling the first shaft;
a second bearing encircling the second shaft;
a first end cap affixed to the housing and defining a first aperture;
a second end cap affixed to the housing and defining a second aperture;
a first spring around the first shaft outside the frame and constrained by the first end cap and the main mass;

a second spring around the second shaft outside the frame and constrained by the second end cap and the end mass; and
guide rails configured to constrain a motion of the multiple magnets, the main mass, and the end mass;
moving the multiple magnets and the frame in a first direction in response to energizing the multiple coils, thereby compressing the first spring;
moving the first shaft in the first direction;
de-energizing the multiple coils;
expanding the first spring, thereby returning the multiple magnets to an initial magnet position and the first shaft to an initial shaft position;
moving the multiple magnets and the frame in a second direction, thereby compressing the second spring;
moving the second shaft in the second direction; and
expanding the second spring, thereby returning the multiple magnets to the initial magnet position and the second shaft to a second initial shaft position.

9. The method of claim 8, wherein the first shaft, the second shaft, the first bearing, and the second bearing cooperate to constrain the multiple magnets to a linear motion.

10. The method of claim 8, further comprising maintaining the first bearing and the second bearing stationary with respect to the housing while the multiple magnets move in the first direction and the second direction.

11. The method of claim 8, wherein: the operation of moving the multiple magnets in the first direction comprises moving the multiple magnets along the guide rails.

12. The method of claim 8, wherein the guide rails cooperate with the first shaft and the second shaft to constrain the multiple magnets to a linear motion.

13. An actuator for an electronic device, comprising:
a housing;
an array cap disposed within the housing;
multiple magnets positioned at least partially within the array cap;
a set of spacers positioned at least partially within the array cap, each of the spacers in the set separating two magnets of the multiple magnets;
a group of coils surrounding a portion of the multiple magnets and positioned at least partially within the array cap;
a main mass affixed to a first magnet of the multiple magnets;
an end mass affixed to a second magnet of the multiple magnets;
a first shaft received within, and extending from, the main mass;
a second shaft received within, and extending from, the end mass;
a first bearing encircling the first shaft;
a second bearing encircling the second shaft;
a first end cap affixed to the housing and defining a first aperture;
a second end cap affixed to the housing and defining a second aperture;
a first spring around the first shaft outside the array cap and constrained by the first end cap and the main mass;
a second spring around the second shaft outside the array cap and constrained by the second end cap and the end mass; and
guide rails configured to constrain a motion of the multiple magnets, the main mass, and the end mass; wherein
the multiple magnets, the main mass, the array cap, and the end mass are configured to move along the guide rails.

14. The actuator of claim 13, wherein:
the first shaft extends into a first void defined by the first end cap; and
the second shaft extends into a second void defined by the second end cap.

15. The actuator of claim 13, wherein:
the guide rails encompass exterior edges of the multiple magnets; and
the guide rails pass through the main mass.

16. The actuator of claim 15, wherein the guide rails are C-shaped.

17. The actuator of claim 13, further comprising a set of stabilization magnets adjacent opposing sidewalls of the housing.

18. The actuator of claim 13, wherein the first and second springs are wound oppositely from one another.

19. The actuator of claim 18, wherein the first spring is configured to counter torque from the second spring.

20. The actuator of claim 13, wherein the first shaft and the second shaft are positioned outside the multiple magnets.

* * * * *